United States Patent [19]
Hamaguchi et al.

[11] Patent Number: 5,327,538
[45] Date of Patent: Jul. 5, 1994

[54] METHOD OF UTILIZING COMMON BUSES IN A MULTIPROCESSOR SYSTEM

[75] Inventors: Kazumasa Hamaguchi, Kawasaki; Shigeki Shibayama, Yokohama, both of Japan

[73] Assignee: Canon Kabushiki Kaisha, Tokyo, Japan

[21] Appl. No.: 756,547

[22] Filed: Sep. 9, 1991

[30] Foreign Application Priority Data

Sep. 11, 1990 [JP] Japan .................................. 2-239051

[51] Int. Cl.⁵ .......................................... G06F 13/368
[52] U.S. Cl. .............................. 395/325; 364/DIG.2; 364/228.1; 364/228.3; 364/229.2; 364/240.2; 364/240.4; 364/245.7
[58] Field of Search ............... 395/325, 375, 725, 425; 364/DIG. 1

[56] References Cited
U.S. PATENT DOCUMENTS

| | | | |
|---|---|---|---|
| 4,480,307 | 10/1984 | Budde et al. | 395/325 |
| 4,785,394 | 11/1988 | Fischer | 395/325 |
| 4,797,815 | 1/1989 | Moore | 395/325 |
| 4,888,684 | 12/1989 | Lilja et al. | 395/325 |
| 4,891,787 | 1/1990 | Gifford | 395/375 |

Primary Examiner—Debra A. Chun
Attorney, Agent, or Firm—Fitzpatrick, Cella, Harper & Scinto

[57] ABSTRACT

In a multiprocessor system wherein a main storage is divided into a plurality of banks and a plurality of common buses are provided, in order to access the main storage. Each processor selects and acquires one of the buses in accordance with the utilization status of the common buses, and releases the bus after transmitting an access request utilizing the acquired bus. After processing the request, the main storage selects and acquires one of the buses in accordance with the utilization status of the common buses at that time independently of the bus which has transmitted the request, and transmits a result of the processing to the processor which has transmitted the access request utilizing the acquired bus.

5 Claims, 4 Drawing Sheets

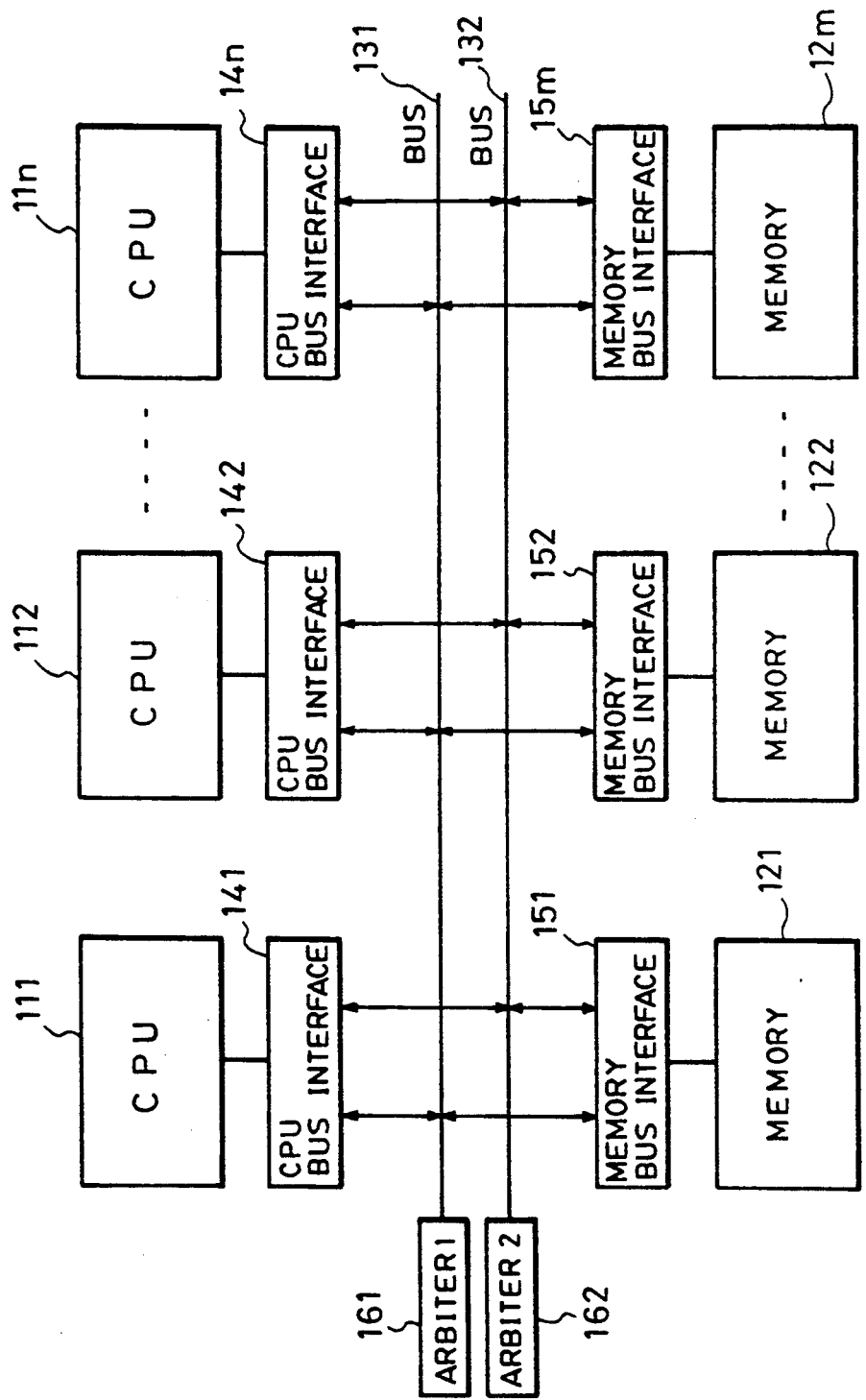

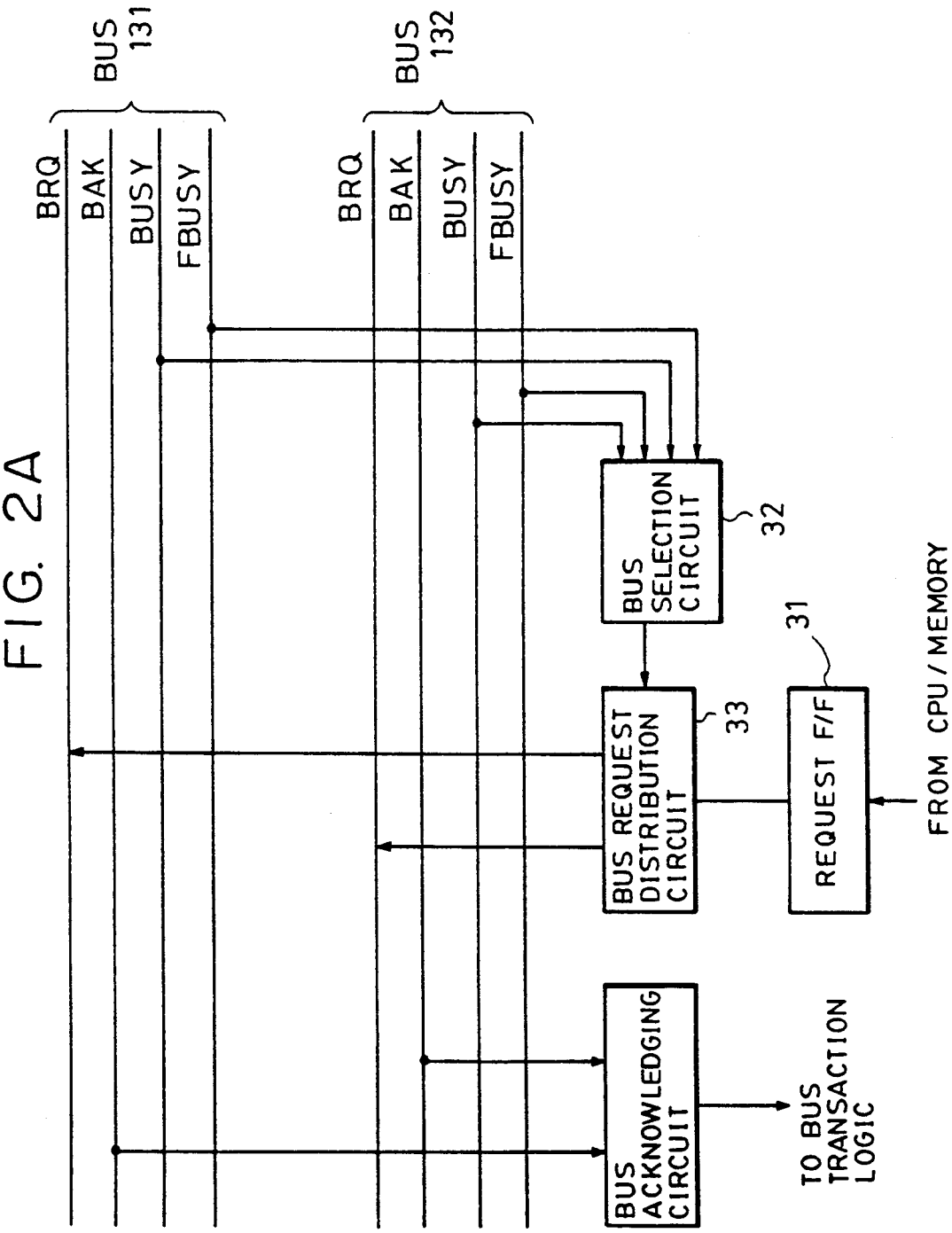

FIG. 2B

| BUS 131 | | BUS 132 | | SELECTED BUS |
|---|---|---|---|---|
| BUSY | FBUSY | BUSY | FBUSY | |
| 0 | 0 | 0 | 0 | 131 |
| 1 | 0 | 0 | 0 | 132 |
| 0 | 1 | 0 | 0 | 132 |
| 1 | 1 | 0 | 0 | 132 |
| 0 | 0 | 1 | 0 | 131 |
| 1 | 0 | 1 | 0 | 131 |
| 0 | 1 | 1 | 0 | 132 |
| 1 | 1 | 1 | 0 | 132 |
| 0 | 0 | 0 | 1 | 131 |
| 1 | 0 | 0 | 1 | 131 |
| 0 | 1 | 0 | 1 | 131 |
| 1 | 1 | 0 | 1 | 132 |
| 0 | 0 | 1 | 1 | 131 |
| 1 | 0 | 1 | 1 | 131 |
| 0 | 1 | 1 | 1 | 131 |
| 1 | 1 | 1 | 1 | |

METHOD OF UTILIZING COMMON BUSES IN A MULTIPROCESSOR SYSTEM

BACKGROUND OF THE INVENTION

1. Field of the Invention

This invention relates to a method of utilizing common buses in a multiprocessor system in which a main storage is divided into a plurality of banks, and a plurality of common buses are provided.

2. Description of the Prior Art

Common buses in a multiprocessor system have been widely used as information transmission means among units having a high cost performance. In most cases, from an electrical point of view, the bus comprises a lead wire. At a certain time period, a unit trying to transmit information occupies the bus, and at least one unit trying to receive information receives the information. Since variations are present in the transmission of information between units in a system, the high cost performance of the common bus resides in that a single hardware, i.e., the bus, is used for all transmission of information. However, for various reasons, particularly because of reduced instruction set computers (RISCs), the bandwidth of the bus, particularly, a memory bus for connecting a CPU to a main storage, has become incapable of keeping up with the supply of data resulting from increase in speed of the CPU.

In order to solve such a problem, there have been adopted a method wherein a CPU is connected to a main storage by a network having a more complicated structure than a bus, a method wherein a CPU is connected to a main storage via a plurality of buses wherein the main storage is divided into a plurality of banks, and the buses are addressed differently, and a method wherein the data width of a bus is widened, and the like.

The above-described conventional methods, however, have the following problems.

In the method wherein a CPU is connected to a main storage by a network having a complicated structure, the cost is higher than when using a plurality of buses. In the method wherein a main storage is divided into a plurality of banks with different addresses, a dedicated bus can be allocated to each bank. Since buses are fixedly allocated in accordance with their addresses, dispersion of load among buses cannot be obtained. As a result, a situation may arise such that, while a certain bus is busy, the rate of utilization of other buses is low. In the method wherein the data width of a bus is widened, access might be concentrated on a particular memory bank.

SUMMARY OF THE INVENTION

It is an object of the present invention to provide a method of efficiently utilizing common buses in a multiprocessor system.

It is another object of the present invention to provide a method of utilizing common buses which can suppress a load bias in a plurality of common buses in a multiprocessor system.

The invention is directed to a common bus arrangement in a processor system in which a processor acquires one of the common buses, transmits a request via the acquired bus and releases the acquired bus.

According to one aspect, the present invention which achieves these objectives relates to a method of utilizing common buses in a multiprocessor system, comprising the steps of acquiring a common bus by a processor requesting access to a shared memory, transmitting a request to the shared memory via the acquired common bus, releasing the first common bus, processing the request by the shared memory, acquiring one of the common buses by the shared memory, and transmitting a result of the processing to the processor via the common bus acquired by the shared memory.

According to another aspect, the present invention which achieves these objectives relates to a processor capable of accessing a shared memory via a bus shared with another processor, comprising acquisition means for acquiring the common bus in order to access the shared memory, transmission means for transmitting an access request to the shared memory via the acquired bus, and control means for controlling so as to release the bus after transmitting the request.

According to still another aspect, the present invention which achieves these objectives relates to a shared memory connected to a plurality of processors via a common bus capable of being utilized by each of the processors, the shared memory comprising processing means for processing an access request from any of the processors, means for acquiring the common bus in order to transmit a result of the processing to the processor, and transmission means for transmitting a result of the processing to the processor via the acquired common bus.

Other objectives and advantages besides those discussed above shall be apparent to those skilled in the art from the description of the preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 1 is a block diagram of a multiprocessor system according to an embodiment of the present invention;

FIG. 2A is a detailed block diagram of a bus selection unit of a bus interface;

FIG. 2B is a table of bus selection by a bus selection circuit;

DETAILED DESCRIPTION OF THE PREFERRED EMBODIMENT

Figure 3:
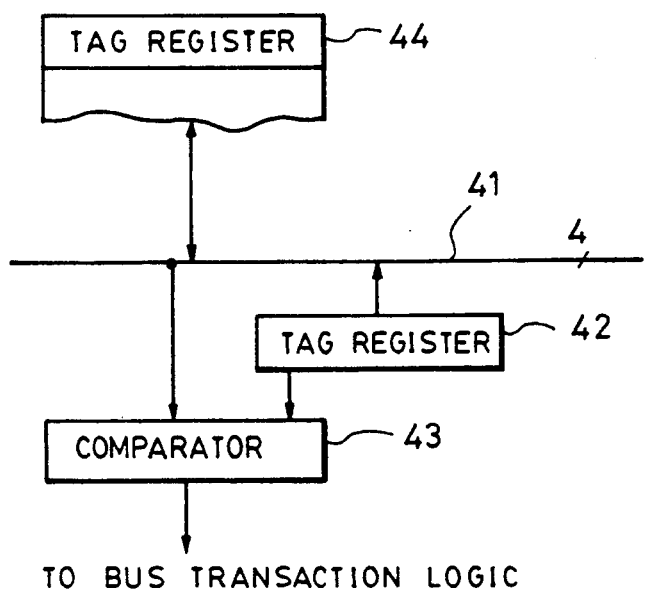
FIG. 3 illustrates a circuit configuration for tag comparison.

The preferred embodiment of the present invention will now be explained with reference to the drawings.

FIG. 1 is a block diagram showing the configuration of a computer system according to the embodiment. The present computer system comprises n CPU units 111, 112 . . . 11n, m main storage banks 121, 122, . . . 12m, two memory buses 131 and 132, CPU bus interfaces 141, 142, . . . 14n for the respective CPU units, main-storage-bank bus interfaces 151, 152, . . . 15m, and arbiters 161 and 162.

FIG. 2A is a detailed block diagram of a bus selection unit of the bus interface. The configuration of the bus interface is basically the same for both the CPU and the memory. In particular, the bus selection unit has the same configuration.

Both the buses 131 and 132 symmetrically include control lines for bus request (BRQ) signals, bus acknowledge (BAK) signals, bus busy (BUSY) signals and future bus busy (FBUSY) signals. In FIG. 2A, data lines and the like are not illustrated.

When a bus request signal arrives from the CPU or the main storage, a request flip-flop 31 is set. A bus selection circuit 32 detects a BUSY signal representing the status of the use of the bus at that time and an FBUSY signal representing the status of the use of the bus in future, and selects a bus in accordance with the result of the detection, for example, according to a table shown in FIG. 2B, and transmits a request (RQ) signal set in the request flip-flop 31 as a BRQ signal while switching a bus request distribution circuit 33 to the selected bus.

Although the bus selection circuit 32 may be simply configured by a look-up table, a higher speed may be obtained if the bus selection circuit 32 is configured by circuitry, such as gates or the like. Bus selection is performed, for example, in the following manner: If a bus which is not used at present and is also not reserved in future at present, the bus is selected, and a BRQ signal is issued while switching the bus request distribution circuit 33 to the bus. If such a bus is not present, a BRQ signal is issued for a bus which is not reserved in future. If such a bus is not present, a BRQ signal is issued to a bus which is not used at present. If such a bus is not available, a BRQ signal is issued for either predetermined one of the buses 131 and 132, or randomly. If the above-described priority for issuing a request for a bus is equal for both the buses 131 and 132, a BRQ signal is issued for either predetermined one of the buses 131 and 132, or randomly.

Control may be performed so that, when a BAK signal for the above-described request is returned, FBUSY is asserted at that time, BUSY is negated, and BUSY is asserted when the CPU or the memory uses the bus.

The table shown in FIG. 2B represents an example wherein the bus 131 is preferred when priority is the same for the buses 131 and 132. Alternatively, a future plan of the use of the buses may be included in the conditions of selection, or the conditions may differ for the CPU side and the memory side, or for the respective CPUs and for the respective memories. Optimum conditions of selection may be considered for each system.

FIG. 3 shows a tag line 41 which is a part of the bus, and comparison logic thereof.

During a bus transaction, the bus is first released, and a request and a response are separated. Hence, the memory side must identify which CPU has issued the request, and return a response. When transmitting a request, each CPU transmits its own identification number stored in a tag register 42 at the CPU side to the memory side via the tag line 41. This identification number is stored in a tag register 44 at the memory side. When transmitting a response for the request, each bus interface at the memory side transmits a tag, stored when the request has been received from the tag register 44, to the tag line 41 to make the bus interfaces at the CPU side identify the response. Each bus interface at the CPU side compares the contents of the tag register 42 holding its own tag number with the contents of the tag line 41 in a comparator 43. If it is confirmed that the response is for the bus interface itself, the bus interface notifies a typical bus transaction logic (not shown) of the fact.

Figure 4:
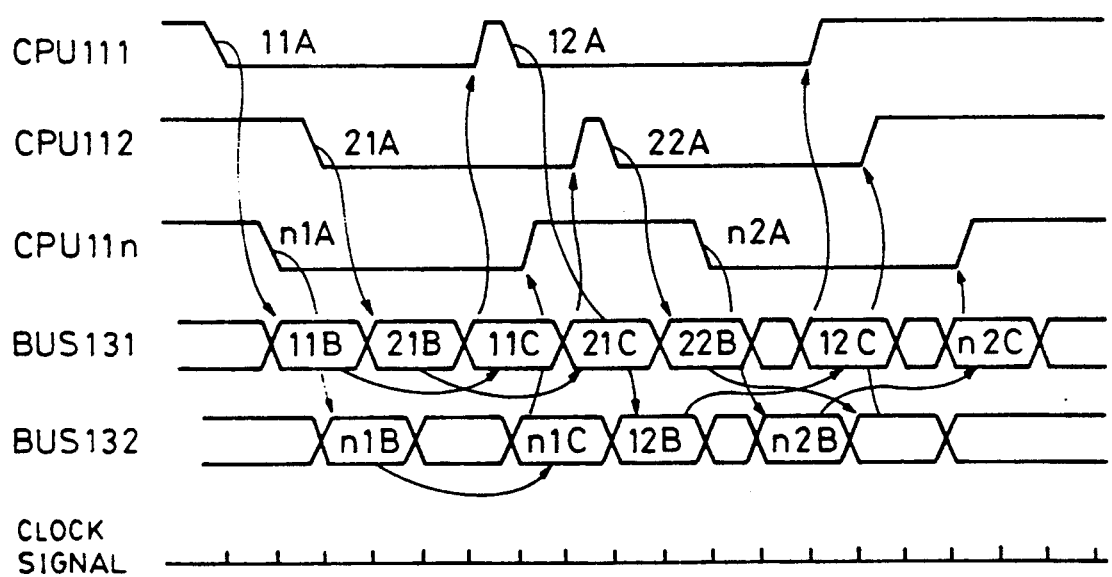
FIG. 4 is a timing chart showing the operation of the embodiment.

FIG. 4 is an example of a timing chart of the operation of the computer system shown in FIG. 1 realized according to the above-described configuration. An explanation will now be provided with reference to the timing chart of the operation.

First, the CPU 111 transmits a memory read request signal 11A to the CPU bus interface 141. Since both the buses 131 and 132 are unoccupied at that time, the CPU bus interface 141 selects the bus 131, and transmits an address to be read to the main storage banks at cycle 11B. The main storage banks are divided according to modulo value addresses, and are configured so that addresses having different modulo values can be accessed in different banks in parallel. For example, the memory 122 may be accessed by the address. After transmitting the address to be read, the CPU bus interface 141 releases the bus 131.

If the CPU 112 transmits a memory read request signal 21A to the CPU bus interface 142, the fact that the bus 132 is to be occupied by a request signal n1A from the CPU 11n can be detected according to an FBUSY signal of the bus 132. Since an FBUSY signal is not present on the bus 131, the CPU bus interface 142 acquires the bus 131 not having an FBUSY signal as a bus for transmitting the read request signal 21A, and transmits the read request signal 21A via the bus 131 at cycle 21B. The read request signal 21A is transmitted, for example, to the memory 121.

Subsequently, a response signal 11C for the read request signal 11A is returned via the bus 131 from the memory 122. When the response signal 11C is returned via the bus 131 to the CPU bus interface 141, the memory read request signal 11A of the CPU 111 is negated.

The CPU 111 immediately issues the next read request signal 12A. The CPU-side bus interface 141 detects that the bus 131 is subsequently to be occupied by a response signal 21C from the memory 121 for the read request signal 21A from the CPU 112 according to an FBUSY signal of the bus 131. Since an FBUSY signal is not present on the bus 132, the request signal 12A is transmitted via the bus 132 at cycle 12B. The request signal 12A is, for example, a request for the memory 12m.

The memory 12m tries to return a response for the request starting from a second clock signal after the completion of processing for the request signal 12A. At that time, however, since the bus 132 used for the request is occupied by a request signal n2A of the CPU 11n, the response signal 12C is returned via the bus 131 which is not used at that time.

As described above, by providing a function wherein a request and a response are separated and the bus is released during bus transaction, and by transferring information by selecting a bus which can be first utilized independently in a request and in a response, it is possible to obtain a high rate of utilization of buses, and to improve characteristics of the system. The solution of bus requests on a certain bus may be performed according to a procedure which has been established as a common technique using the arbiters 161 and 162.

As for priority for bus selection in the present invention, for signal lines having information relating to the future use of buses, or for buses having bus cues, priority may be set according to a method of selection other than the method shown in the present embodiment using cue information. Even if signal lines having the same functions as in the present embodiment are used, another priority order may be set in order to increase efficiency of the utilization of buses in accordance with properties of the system.

When a request and a response on buses are separated, a method wherein an ID signal for bus transaction is generated and used may, for example, be adopted, aside from the method shown in the present invention.

In short, various changes and modifications may be made without departing from the true spirit and scope of the present invention.

According to the present invention, it is possible to provide a computer system which has a high cost performance and which can use buses with a high rate of utilization in a system wherein a plurality of units are connected to common buses.

That is, according to a linked operation of CPU interfaces, memory interfaces, and bus selection logic within the above-described two kinds of interfaces, it is possible to configure a computer system which can efficiently utilize a plurality of buses and has a high data transfer rate. Furthermore, by omitting a bus line having a fixed error as an object of selection as a condition of bus selection, it is possible to configure a fault-tolerant computer system.

What is claimed is:

1. A method of utilizing common buses in a multiprocessor system where each of a plurality of common buses is connected to a plurality of processors and a plurality of shared memories, comprising the steps of:
    acquiring a first one of the plurality of common buses by one of the plurality of processors requesting access to one of the plurality of shared memories;
    transmitting the request to said one of the plurality of shared memories via the first acquired one of the plurality of common buses;
    releasing the first acquired one of the common buses by said one of the plurality of processors after transmitting said request without waiting for a reply therefor;
    processing said request by said one of the shared memories;
    acquiring a second one of the plurality of common buses independent of said first one by said one of the shared memories; and
    transmitting a result of the processing to said one of the plurality of processors via the second acquired one of the plurality of common buses.

2. A method of utilizing common buses according to claim 1, wherein said acquiring of the first and the second ones of the plurality of common buses is determined on the basis of a current status of acquisition of the common buses.

3. A method of utilizing common buses according to claim 1, further comprising the steps of:
    transmitting processor identifying information from said one of the plurality of processors transmitting the request to said one of the plurality of shared memories;
    holding said identifying information by said one of the plurality of shared memories; and
    transmitting said identifying information from said one of the plurality of shared memories together with said result of the processing.

4. A method of utilizing common buses according to claim 3, further comprising the steps of:
    comparing said identifying information transmitted from said one of the plurality of shared memories with each of processor identifying information by respective processors; and
    recognizing that said transmitted result of the processing is for the processor whose identifying information accords with the transmitted identification information as a result of the comparison.

5. A multiprocessor system, where each of a plurality of common buses is connected to a plurality of processors and a plurality of shared memories,
    each of said plurality of processors comprising:
    first acquiring means for acquiring a first one of the plurality of common buses;
    first transmission means for transmitting a request for access to said one of the plurality of shared memories via the first acquired one of the plurality of common buses; and
    releasing means for releasing the first acquired one of the common buses after transmitting said request without waiting for a reply therefor;
    each of the said plurality of shared memories comprising:
    processing means for processing a request for access from one of said plurality of processors;
    second acquiring means for acquiring a second one of the plurality of common buses independent of said first one; and
    second transmission means for transmitting a result of the processing to the one of the plurality of processors requesting the access via the second acquired one of the plurality of common buses.

* * * * *